United States Patent [19]

Möller et al.

[11] 4,158,350
[45] Jun. 19, 1979

[54] APPARATUS FOR SYSTEM CONTROL, ESPECIALLY IGNITION TIMING OF INTERNAL COMBUSTION ENGINES

[75] Inventors: Heinz Möller; Josef Wahl, both of Stuttgart, Fed. Rep. of Germany

[73] Assignee: Robert Bosch GmbH, Stuttgart, Fed. Rep. of Germany

[21] Appl. No.: 793,323

[22] Filed: May 3, 1977

[30] Foreign Application Priority Data

May 7, 1976 [DE] Fed. Rep. of Germany ....... 2620182

[51] Int. Cl.² ............................................. F02P 5/04
[52] U.S. Cl. ................................. 123/117 R; 318/609
[58] Field of Search .......... 123/117 R, 117 A, 117 D, 123/102; 318/609, 610, 663; 324/15, 16 R, 16 T, 16 S

[56] References Cited

U.S. PATENT DOCUMENTS

| | | | |
|---|---|---|---|
| 3,697,865 | 10/1972 | Smith et al. | 324/16 T |
| 3,781,656 | 12/1973 | Glew | 324/16 T |
| 3,785,356 | 1/1974 | Niemoeller | 123/117 R |
| 3,791,357 | 2/1974 | Cook | 123/117 R |
| 3,815,560 | 6/1974 | Wahl et al. | 123/117 R |
| 3,858,289 | 1/1975 | Westervelt et al. | 324/16 R |
| 3,871,341 | 3/1975 | Kalogerson et al. | 123/117 A |

Primary Examiner—Charles J. Myhre
Assistant Examiner—Andrew M. Dolinar
Attorney, Agent, or Firm—Edwin E. Greigg

[57] ABSTRACT

The controlled variable of a system, in particular the timing of an internal combustion engine, is changed on the basis of a set point signal by a closed control loop which alters the relative settings of the breaker points and the distributor shaft, for example. The set point is a single value related to a specific set of magnitudes of engine variables. When the engine exhibits this specific set of magnitudes, the control loop is closed and the engine timing is adjusted to the set point. At other times, the timing follows open-loop, forward control signals such as provided by vacuum advance mechanisms, flyweight governors, etc. The apparatus includes a locking mechanism for locking the relative position of the breaker plate after adjustment by the closed loop controller.

12 Claims, 3 Drawing Figures

APPARATUS FOR SYSTEM CONTROL, ESPECIALLY IGNITION TIMING OF INTERNAL COMBUSTION ENGINES

BACKGROUND OF THE INVENTION

The invention relates to a method for controlling a process with a set point which is variable and which can be changed to encompass the entire domain of the system. The invention particularly relates to a method for controlling the ignition timing of a spark plug ignited internal combustion engine in dependence on a plurality of variable operational parameters which affect the set point value, for example the engine speed (rpm), induction tube pressure, temperature, engine load, etc.

Known in the art are methods for controlling systems in dependence on operational parameters by changing the set point value. In many of these known methods, for example in methods for controlling a process, the set point value which governs the controlled variable changes according to predetermined functions which often are influenced additionally by the actual parameters of the sometimes very complicated control system. This means that a multitude of data must be collected in order to form the set point value which is later to be compared with the prevailing actual value and these data must be translated and processed with the aid of complicated circuitry such as transducers and/or function generators. The set point value which is a variable that depends on a multitude of such information is determined at each point of time and in every operational domain of the engine and is transmitted for example as a voltage to a summation point or a comparator in the control system.

Even when the systems to be controlled are relatively simple, the amount of effort and hardware required to produce the set point value is quite substantial and is not always justified by the results, for the basic purpose of any control system is to prevent any increasing excursion of the position of the final control element and this is achieved by feeding back a signal proportional to the actual value to the input of the system so that the entire process or system is controlled rigidly.

The present invention recognizes and makes use of the fact that, in a large number of processes in many technical areas, the error accumulation never exceeds a limiting value even if no feedback control is employed for considerable periods of time.

OBJECT AND SUMMARY OF THE INVENTION

It is thus a primary object of the invention to provide a generally useable method of control and an apparatus for carrying out that method. It is a further object of the invention to provide a control process which permits complicated adjustments of the final control element without however requiring complicated systems and function generators or the like for the purpose of generating a set point value. A particular object of the present invention is to provide a method for controlling the automatic adjustment of the timing in a spark plug ignited internal combustion engine. Yet another object of the invention is to provide a method of control and an apparatus therefor which automatically eliminates or compensates for any errors due to wear and tear, i.e., especially long term errors and undesirable changes of the engine timing.

These and other objects are attained according to the invention by providing a control process in which the control takes place for short periods of time as feedback control, i.e., closed loop control, whereas during the remaining operational domain the final control element is engaged in the sense of open loop control.

It will be appreciated that a method of control of this type may be used in a variety of situations. In the detailed description below, the invention is described principally with respect to the problems which arise in the adjustment and control of the timing of an internal combustion engine. If the method of controlling an engine according to the present invention is used, it is possible to disregard the entire complicated internal construction of the apparatus which provides the set point value for the ignition timing, and merely to provide a constant set point value in the simplest manner during a possibly very short part of the work cycle. Any change of the final control element which is required is made so as to reattain the original timing setting. When the part of the work cycle just described is over, the closed loop control is turned off and any further adjustment of the timing takes place by forward, i.e., open loop control.

By a way of explanation there will be discussed those steps which have been required heretofore in order to satisfy the many demands made on a control system in modern internal combustion engines. One of these steps is in particular the adjustment of the timing, i.e., the instant of ignition, with due consideration to the composition of the exhaust gas with a view to non-toxic effluence.

In the simplest case in known ignition systems, the ignition timing is provided by mechanical interruption of the ignition current and with a mechanical distributor for the high voltage. The mechanical timing elements are generally subject to some adjustment on the basis of rpm and engine load which alters their relative position with respect to the crankshaft. The adjustments are made with a view to economical operation and complete combustion at the same time as the efficiency and power is maximized over the total domain of rpm and load.

In the discussion of these problems it is important to note that other important variables which affect the operation and hence affect the exhaust gas composition can be combined into a set point value which engages a control loop that additionally affects the timing of an engine. If this is done, the timing is advanced or retarded according to the magnitude of the set point value. If one where to take account of all of the requirements, the set point value would have to respond to a multitude of ever-changing operational parameters and would have to reduce them in a more or less complicated fashion to a single value. The operational parameters in question are, for example, the engine rpm and the engine speed changes, the induction tube pressure, the exhaust gas composition, the position of the throttle valve, as well as for example a suitably measured engine temperature. Sensing and transducing all of these parameters and reducing them to a single set point value to obtain a sensitive and exact control of the ignition timing requires an effort and an expenditure of a magnitude which often prohibits the use of this method. It is at this point that the invention provides a signal improvement, permitting a manner of control which is just as precise as that previously discussed and which permits the governing of the ignition timing in an internal combustion engine or, more generally, the position of a final control element of any control system, without however detecting each and every instantaneous magnitude of a multitude of parameters. It is assumed that the ideal, i.e., theoretically desirable, timing is known for each operational state of any particular type of engine. Additionally or alternatively it is assumed that transducers are available to sense any operational state of the engine and that mechanisms are available to translate signals so derived to change the engine timing so as to produce the proper ignition timing at the desired time. For example, it is assumed that vacuum pressure cells are available which engage a plate that carries the contact points of the distributor or that, for example, there is available a flyweight governor which can change the angular position of the distributor shaft in dependence on rpm.

Translated to the case of a general control system, it is assumed that there is available a suitable number of mechanisms which are able to set the final control element in open loop forward control depending on the operational state of the system. While this permits a consideration of all the parameters which can possibly affect the timing, it is well known that such pure forward control permits undesired changes in the ignition timing or in the performance of the system which can have deterimental effects regarding power consumption and exhaust gas composition. The method and apparatus according to the invention corrects this fault in a manner to be described in greater detail in the following description of a number of preferred embodiments taken in conjunction with the drawing.

DESCRIPTION OF THE PREFERRED EMBODIMENTS

Figure 1:
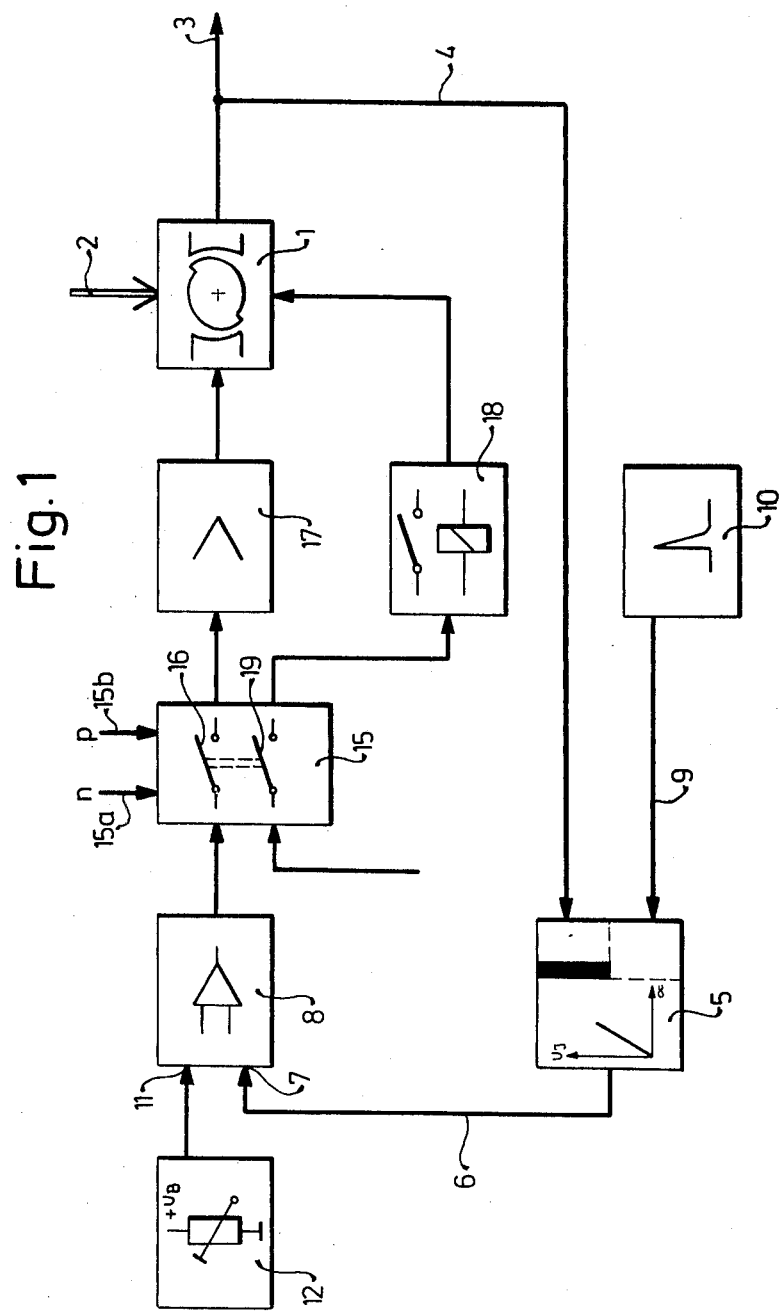
FIG. 1 is a block diagram of a first exemplary embodiment of the invention for setting and automatically adjusting the timing of an engine.

Turning now to the back diagram of FIG. 1, there will be seen a final control element 1 which is the principal element responsible for generating the ignition pulse and the exact timing of ignition pulse occurrence. The final control element may be a mechanical contact point system which is often used for generating the ignition pulses and which feeds a subsequent high voltage coil. The breaker contacts which supply battery current to the coil are switched by a rotating member of the engine which will be referred to below as a cam and has a number of lobes corresponding to the number of ignition pulses or sparks to be generated for each crankshaft rotation. If the breaker point system is assumed to be stationary, the timing is determined by the periodic cooperation of the rotating cam and the contact points which it switches. It is possible to make available adjustments on the basis of operational parameters; these are indicated by double arrow 2 and may include a flyweight or centrifugal adjustment mechanism of the cam element, a mechanism for changing the relative angular position of the breaker point plate, for example by using the induction tube or carburetor vacuum, and other possibilities, for example a temperature-dependent adjustment. In general, the timing may be changed in these or similar manners to take account of any operational conditions but, as already discussed, the simple forward control employed here would permit a drift of the actual ignition timing far from its set point or theoretical value without further steps.

It is thus a principal characteristic of the present invention to provide a closed control loop which checks the position of the final control element at certain times and if necessary resets it. The control loop can however be of very simple construction and does not require the very complicated set point generator which is needed when continuous closed loop control is employed.

The output of the final control element 1 is the ignition pulse 3 which is processed in the usual manner and which is finally delivered to the combustion chambers of the engine. A return line 4 carries the timing signal 3 to an actual valve transducer 5 which takes the spike-shaped ignition pulse and processes it so that it is available as an actual value signal on the line 6 which is connected to the input 7 of a comparator and control amplifier 8.

The construction of the actual value generator 5 is not of great importance in the context of the present invention but will nevertheless be explained briefly. The generator 5 is a bistable switch which is flipped into its set position by a pulse delivered on a line 9. This pulse is provided by a pulse generator 10, for example by an element attached to a rotating part of the engine, the passage of which is sensed and transduced into a pulse which is used to set the flip-flop 5 via the line 9. The flip-flop 5 is then reset by the timing signal 3 on the line 4 so that the output signal of the flip-flop 5 depends in duration on the time of occurrence of the ignition signal 3 and it may be further changed into an output voltage of specified amplitude by an integrating circuit. In this manner, the input 7 of the control amplifier 8 receives a voltage of suitable shape and amplitude which is regarded as the actual value signal which is representative of the timing, i.e., the chronological position of the ignition pulse. The other input 11 of the amplifier 8 receives a set point value from a set point generator 12 which may be simply a potentiometer delivering a constant voltage. It should be noted again that the set point value, which is a voltage derived by the fixed position of the potentiometer, is used, i.e., compared with the actual voltage, only during a very short period of time in which that set point value is correct.

Following the control amplifier 8 is a switching assembly 15 having at least one switch contact 16. The assembly 15 is able to recognize the previously mentioned preferred operational state of the entire system and can release the control loop for operation. For this purpose, the switch assembly 15 closes the contact 16 so that the output signal from the control amplifier which is related to the difference between the set point value and the actual value is carried to the final control element 1, if necessary via an output amplifier 17. If the adjustment of the system had shifted in the previous open loop forward control, i.e., if changes and errors have occurred in the setting of the final control element, that difference is sensed under closed loop control as a differential voltage at the output of the control amplifier and so alters the position of the control element 1 as to reduce that difference, i.e., to regain the original setting of the system and in particular the original setting of the ignition timing in an internal combustion engine. The closed loop control is maintained as long as the switch assembly 15 recognizes the operational domain of the engine to be that corresponding to the constant set point. As soon as the system enters a different operational domain, for example if the engine speed changes or the induction tube pressure changes, the switch 15 opens the control loop by opening at least the contact 16 so that closed loop control is ineffective until the preferred operational state reoccurs, i.e., the state for which the set point voltage delivered by the generator 12 is correct. In FIG. 1 the switch assembly 15 is shown to have two inputs related to operational parameters, for example the rpm n and the induction tube pressure p, respectively labeled 15a and 15b. The switch assembly 15 is so constructed that it closes the control loop if the desired operational domain is attained, for example the starting domain of the engine.

This type of follow-up control of a switching point which has moved away from its nominal set point value can also be regarded as an adjustment within a large domain of adjustment. The closed loop control has the further provision that the adjustment made by the control system of the invention can be held constant or locked in place so as prevent immediate errors when the closed loop control is cut off by the switch assembly 15 after the engine has left the predetermined domain of operation in which the closed loop control is effective. This lock-in is provided by a lock-in circuit 18 which is actuated at the same time as the switch 16 and which causes a lock-in of the new adjusted value obtained by means of the closed loop control.

Figure 2:
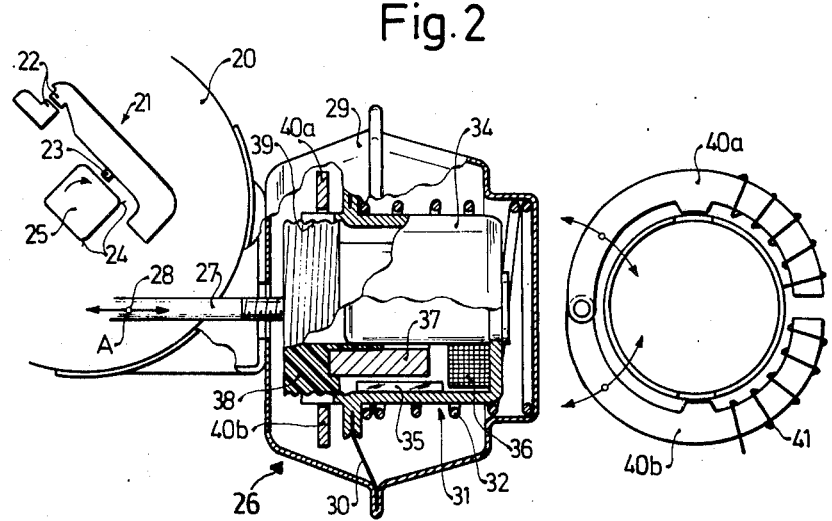
FIG. 2 illustrates a mechanism for a short term control of the timing.

The manner in which the adjustment of the timing is performed will now be explained with reference to a first exemplary embodiment illustrated in FIG. 2. On a carrier plate 20 is mounted a breaker point assembly 21, not further described. The contacts 22 of the breaker point assembly 21 are opened and closed by the interaction of a projection 23 with one of the cam lobes of the rotating cam shaft 25. It will be seen that a rotation of the carrier plate 20 with respect to the cam shaft changes the time at which the contacts are opened and closed. This relative rotation is made possible by a vacuum actuator 26 which changes the rotary position of the carrier plate 20 by means of a connecting rod 27 which is pivotally attached at the carrier plate 20 at a point 28. The vacuum assembly 26 includes a housing 29 in which is clamped a diaphragm 30 which moves an actuating member 31 biased by a spring 32. The connecting rod 27 is seen to be mounted on the actuating body 31 which is capable to perform a piston-like displacement within the housing 29 which is transmitted via the connecting rod 27 to the carrier plate 20 when the vacuum, for example in the induction tube of the engine which is coupled to the assembly 26, undergoes variations. This is the commonly used type of mechanism for changing the timing of the engine in dependence on an external parameter, in this case on the induction tube pressure. Other means of adjustment could engage the breaker point assembly, for example a centrifugal governor could be made to affect the position of the cam shaft 25. In order to make provision for the automatic closed loop control according to the present invention, the actuating body 31 is embodied as a so-called rotary armature magnet with a housing 34. The interior of the housing 34 contains magnetic poles 35 and a coil 36. The rotary armature 37 is also provided with external threads which mate with the internal threads of a preferably plastic outer bushing 39. The manner of operation is such that when an electrical current flows in the coil 36, which is the case when the control loop is closed and there is present a signal from the output amplifier 17, there takes place a rotation of the rotary armature in the sense that the connecting rod is displaced in one or the other of the two directions indicated by the double arrow A and the ignition system is corrected in a sense of being moved to its correct position. As soon as this is done and when the engine enters other operational domains, the control loop of FIG. 1 actuates the lock-in mechanism via the circuit 18. For this purpose, there are provided two brake shoes 40a and 40b which are shown in a special representation of FIG. 2 and which may be moved into their closed, locking position by the force of a spring. If the coil 41 carried by the brake shoes is provided with current, the arrest mechanism is released and the rotary magnet is permitted to rotate for a new adjustment of the timing. In addition or alternatively, the pitch of the threads of the bushing and armature may be so chosen that no rotary motion can be imparted thereto by axial motions of the connecting rod.

Figure 3:
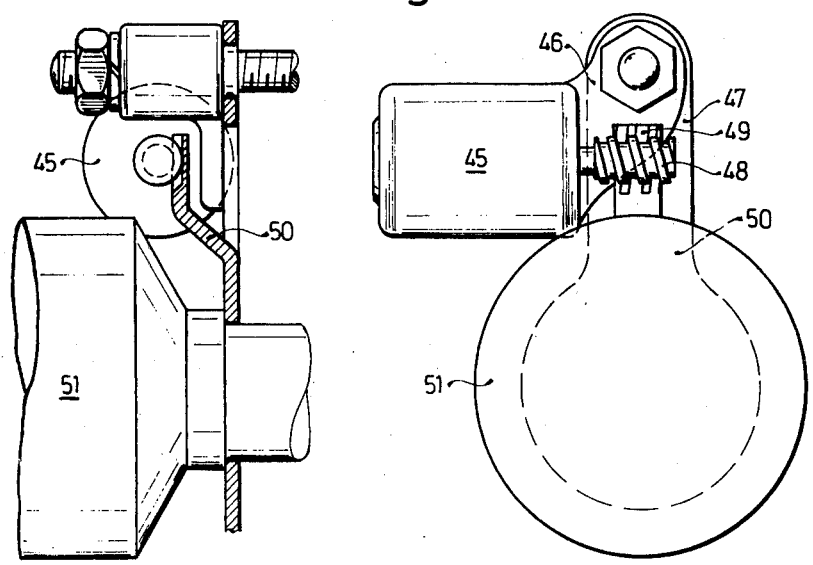
FIG. 3 is an illustration of a second mechanism permitting a control of the timing.

A second exemplary embodiment for permitting a shortterm control engagement of an existing system is illustrated in FIG. 3. The final control element is a servo motor 45 which is mounted by means of a suitable bracket 46 on a portion of the engine block 47. The output shaft of the servo motor 45 has a worm gear which engages an associated set of threads 49 on a lever 50 which is so attached to a distributor mechanism 51, not further illustrated, as to permit the change of the relative angular position of the breaker point assembly and the rotating cam shaft. In this manner the ignition timing may be advanced or retarded.

The lock-in of the adjustment obtained by closed loop control can take place in any suitable manner, for example by spring-biased brake magnets or, as is especially suitable for the exemplary embodiment of FIG. 3, by a magnetic braking field acting on the servo motor 45. The entire locking system should be so embodied that, when the preselected operational state of the engine is recognized by the switch assembly 15, the locking mechanism is released or opened. Subsequently, the control loop is closed and the timing system is adjusted to the correct value, whereupon the lock-in mechanism is re-engaged prior to the termination of the influence of the output amplifier 17 onto the final control element 1. The correct time sequence of these events may be automatically obtained by suitable timing devices.

It has already been mentioned that a control system as described in this invention which is engaged only for fractions of the total time of operation can be applied to other control processes which normally require very complicated set point adjustments. It is significant that only a selected operational point or range for which the set point is constant and known is used for the automatic control process. In this narrow region, the control loop adjusts very precise settings but, when the system departs from this particular selected domain of operation, the control loop opens and the system is left to operate under normal forward control which is sufficiently precise to produce the correct adjustments until such time as the system re-enters the selected region and thus a renewed control and adjustment by a closed loop process may take place.

It is especially advantageous in this type of control that the instantaneous set point value as well as the instantaneous actual magnitudes of engine parameters need not be generated from a multitude of external operational variables by means of complicated circuits, transducers, transformers and other electromechanical systems at all times. For this reason, the control process according to the present invention which uses only a single point or at most a few points of set point control is substantially less expensive but without necessarily sacrificing precision to an unacceptable degree.

The point-wise control process according to the invention also sharply reduces the electrical power requirements because the final control elements are turned on only during the closed loop control. This reduction of the required power is of special significance in motor vehicles.

The foregoing relates to preferred exemplary embodiments of the invention, it being understood that other embodiments and variants thereof are possible within the spirit and scope of the invention.

What is claimed is:

1. A control apparatus for controlling the operation of a system in which a main system variable depends on the magnitude of at least one of a plurality of other variables, comprising:
   final operating means for changing the magnitude of said main variable;
   set point generator means for generating a single set point signal associated with a specific set of magnitudes of said other variables;
   a feedback control loop for comparing the magnitude of said main variable with said single set point signal including means for engaging said final operating means;
   means for detecting the occurrence of a specific set of magnitudes of said other variables and for then closing said feedback control loop causing actuation of said final operating means and adjustment of said main variable to correspond to said single set point signal; and
   means for opening said feedback control loop upon cessation of occurrence of said specific set of magnitudes of said other variables to thereby return the system to direct operation without feedback.

2. A control apparatus as defined by claim 1, wherein said system is an internal combustion engine and said main system variable is the ignition timing of said engine and wherein said other variables include engine speed (rpm), induction tube pressure, temperature, load, and the like.

3. An apparatus as defined by claim 2, further comprising a bistable circuit element for generating a signal related to the actual value of said main variable and means for setting said bistable element periodically, said bistable element being connected to be reset by the ignition timing of said internal combustion engine and including means for generating an analog voltage based on the switching period of said bistable element.

4. An apparatus as defined by claim 1, wherein said single set point signal related to said specific set of magnitudes of said other variables is a set point voltage and said feedback control loop further includes means for generating an actual value signal related to the magnitude of said main variable and means for comparing said single set point signal with said actual value signal.

5. An apparatus as defined by claim 4, wherein said single set point signal and said actual value signal are continuously compared.

6. An apparatus as defined by claim 1, further comprising means for locking the position of said final operating means attained during feedback control.

7. An apparatus as defined by claim 6, wherein said means for detecting the presence of a specific set of magnitudes of said other variables includes switch means for closing said control loop and for actuating said locking means in such a way that said final control element is locked both before and after said closed loop control process.

8. An apparatus as defined by claim 1, further comprising means for generating a signal related to the actual value of said main variable, and wherein said final operating means is a vacuum actuated system including a movable member to which is applied an electric signal related to the difference of said set point signal and said actual value signal to thereby execute a rotary motion which is transmitted to adjust means which affect the magnitude of said main variable.

9. An apparatus as defined by claim 8, wherein said main variable is the timing of an internal combustion engine having a distributor, a cam shaft and breaker points and wherein said final operating means is a carrier plate in the distributor of said internal combustion engine which is capable of relative rotation with respect to the cam shaft that actuates the breaker points.

10. An apparatus as defined by claim 9, wherein said movable member is a rotating armature and further comprising means for arresting the rotation of said rotating armature.

11. An apparatus as defined by claim 10, wherein said means for arresting said rotating armature are brake shoes actuated by electric windings.

12. An apparatus as defined by claim 1, wherein said final operating means is a servo motor and wherein said main variable is the ignition timing of an internal combustion engine, having a distributor and wherein said servo motor adjusts the angular position of the distributor of said internal combustion engine.

* * * * *